United States Patent [19]
Chiu et al.

[11] Patent Number: 5,599,569
[45] Date of Patent: Feb. 4, 1997

[54] USE OF AMYLASE-TREATED LOW-VISCOSITY STARCH IN FOODS

[75] Inventors: Chung-Wai Chiu, Westfield; David P. Huang, Bound Brook; James J. Kasica, Whitehouse Station; Zu-Feng Xu, Somerville, all of N.J.

[73] Assignee: National Starch and Chemical Investment Holding Corporation, Wilmington, Del.

[21] Appl. No.: 412,046

[22] Filed: Mar. 28, 1995

[51] Int. Cl.$^6$ .................................................. C13K 1/06
[52] U.S. Cl. ................... 426/48; 426/49; 426/89; 426/96; 426/103; 426/661
[58] Field of Search ................... 426/48, 49, 89, 426/96, 103, 658, 661, 93, 94

[56] References Cited

U.S. PATENT DOCUMENTS

| | | | |
|---|---|---|---|
| 3,525,672 | 8/1970 | Wurzberg et al. | 195/31 |
| 4,009,291 | 2/1977 | Mitchell et al. | 426/548 |
| 4,038,427 | 7/1977 | Martin | 426/285 |
| 4,079,151 | 3/1978 | Schade et al. | 426/96 |
| 4,510,166 | 4/1985 | Lenchin et al. | 426/565 |
| 4,780,149 | 10/1988 | Kaper et al. | 127/38 |
| 4,855,149 | 8/1989 | Pucci et al. | 426/48 |
| 4,877,634 | 10/1989 | Pucci et al. | 426/531 |
| 4,977,252 | 12/1990 | Chiu | 536/102 |
| 5,266,467 | 11/1993 | Inglett | 435/99 |

FOREIGN PATENT DOCUMENTS

| | | |
|---|---|---|
| 40013/93 | 1/1993 | Australia. |
| 0289138A3 | 11/1988 | European Pat. Off.. |
| 0529892A1 | 3/1993 | European Pat. Off.. |
| 0574721A1 | 12/1993 | European Pat. Off.. |
| 51-088645 | 3/1976 | Japan. |
| 51-079750 | 7/1976 | Japan. |
| 55-85376 | 6/1980 | Japan. |
| 56-49406 | 4/1981 | Japan. |
| 1273593 | 1/1989 | Japan. |
| 1252296 | 6/1989 | Japan. |
| 93/004072 | 1/1993 | Japan. |
| 93/037036 | 6/1993 | Japan. |

OTHER PUBLICATIONS

Takatsuji et al., JP 55–85376, Jun. 1980, Patent Abstracts of Japan.
Kubomura et al., JP 57–144948, Sep. 1982, Patent Abstracts of Japan.
Yasumoto et al., JP 63–214166, Sep. 1988, Patent Abstracts of Japan.
Pierre Würsch and Didier Gumy, "Inhibition of amylopectin retrogradation by partial beta–amylolysis", *Carbohydrate Research*, 256 (1994) pp. 129–137, Elsevier Science B.V., Amsterdam.
Leland Dahle, Vincent Brusco and Gary Hargus, "Some Effects of Beta Amylolytic Degradation of Pastes of Waxy Maize Starch", Journal of Food Science —vol. 38 (1973).
"Sugarless coating for food products", Nabisco, Inc., Chemical Abstracts, vol. 91, 1979.

*Primary Examiner*—Leslie Wong
*Attorney, Agent, or Firm*—Karen G. Kaiser

[57] ABSTRACT

A method for adhering seasoning to a food product comprising the steps of:
a) coating the food product with a solution containing an effective amount of an amylase treated starch;
b) adhering thereon at least one seasoning, flavorant, or colorant; and
c) drying the resultant food product;
the amylase treated starch having been prepared by steam cooking starch, and enzymatically hydrolyzing said cooked starch with amylase in an amount and for a sufficient time to achieve a funnel viscosity (measured at 19% solids using a standard funnel) of 7 to 80 seconds, and a dextrose equivalent (DE) of 2 to 40.

9 Claims, No Drawings

USE OF AMYLASE-TREATED LOW-VISCOSITY STARCH IN FOODS

FIELD OF THE INVENTION

This invention relates to a method for adhering and fixing seasoning additives on cereal or snack food products using amylase converted low viscosity starch hydrolysates.

BACKGROUND OF THE INVENTION

There are many commercial applications wherein it is desired to adhere various seasoning materials such as sugar, salt, cheese powder, spices, colorants or the like to the external surfaces of cereal flakes, biscuits or a snack food such as potato chips, pretzels, tortilla chips, nut products, etc.

In view of the nature of the seasonings to be applied, it is desirable that any material used to adhere the seasoning contribute little or no flavor of its own. Moreover, the material must not only be readily applicable but must be capable of providing strong adherence, even after the foodstuffs to which they are applied have been subjected to subsequent packaging operations, transport and storage.

Further, it is often desired that any material added to foodstuffs be free of any chemical treatments so that the foods may be so labelled.

Fats and oils have traditionally been used for adhering seasonings and flavorings to these products. However, as a result of recent market demand for low-fat and fat-free cereal and snack products, not only are these materials in disfavor as adhesives or binders; there is an additional problem encountered in the need for the adhesive or binder to adhere the flavorant to a food product that already contains a reduced amount of fat and/or oil.

SUMMARY OF THE INVENTION

We have now found that the use of amylase treated starch provides the superior adhesion properties required of a seasoning powder or other flavorant while also providing the food product with protection against moisture and oxidation so as to extend the shelf life or the bowl life, preserve the desired flavors and increase the crispness of the food product. In addition, it also gives the food product a glossy appearance making it more attractive to the consumer.

Thus, the present invention is directed to a method for adhering seasoning to a food product which comprises the steps of:

a) coating the food product with a solution containing an effective amount of an amylase treated starch;

b) adhering thereon at least one seasoning, flavorant, or colorant;

c) drying the resultant food product; and d) the amylase treated starch having been prepared by steam cooking starch, and enzymatically hydrolyzing said cooked starch with amylase in an amount and for a sufficient time to achieve a funnel viscosity (measured at 19% solids using a standard BF Funnel) of 7 to 80 seconds, preferably 16 to 60 seconds and a dextrose equivalent (DE) of 2 to 40.

DETAILED DESCRIPTION OF THE PREFERRED EMBODIMENTS

For use herein, the term "starch" is meant to include any cereal or root starch or flour. Examples of suitable materials include maize, rice, barley, wheat, sorghum, tapioca, potato, the waxy versions thereof as well as their corresponding flours. Converted, i.e., acid treated starches or chemically modified starches may also be used as the starting materials. For reasons of liquid product stability, waxy starch (i.e., containing more than 95% amylopectin) is preferred.

In order to obtain the desired properties, it is necessary that the starch be steam cooked, i.e., "jet cooked", by which is meant that it is slurried and heated to temperatures of about 120° to 170° C., in order to completely gelatinize the starch. The steam cooking is generally carried out in a slurry at a solids level of about 10 to 40%, preferably 20 to 25%, a pH of 4 to 7, preferably 4.5 to 5.5, with a pressure greater than 60 psi in the cooking chamber.

The resultant fully gelatinized starch is then enzymatically hydrolyzed with the amylase using techniques known in the art and described, for example, in U.S. Pat. No. 3,525,672 to Wurzburg et al. and U.S. Pat. No. 4,977,252 to Chiu. Alpha-amylase, beta-amylase or glucoamylase may be used. Generally the enzyme treatment is carried out at a starch concentration level of about 10 to 30%, preferably 18 to 24%, depending upon the base starch being treated. The enzyme reaction is continued until the starch is sufficiently degraded to provide a viscosity of 7 to 80, preferably 16 to 60, seconds measured at 19% w/w solid concentration at room temperature using a standard funnel as described below.

Flow Viscosity (19% solids)

The starch dispersion is adjusted to 19% (w/w) measured by refractometer. The temperature of the dispersion is controlled at 22° C. A total of 100 ml of the starch dispersion is measured into a graduated cylinder. It is then poured into a calibrated funnel while using a finger to close the orifice. A small amount is allowed to flow into the graduate to remove any trapped air, and the balance is poured back into the funnel. The graduated cylinder is then inverted over the funnel so that the contents draw (flow) into the funnel while the sample is running. Using a timer, the time required for the 100 ml sample to flow through the apex of the funnel is recorded.

The glass portion of the funnel is a standard 58°, thick-wall, resistance glass funnel whose top diameter is about 9 to 10 cm with the inside diameter of the stem being about 0.381 cm. The glass stem of the funnel is cut to an approximate length of 2.86 cm from the apex, carefully firepolished, and refitted with a long stainless steel tip which is 5.08 cm long with an outside diameter of 0.9525 cm. The interior diameter of the steel tip is 0.5951 cm at the upper end where it is attached to the glass stem; it is 0.4445 cm at the outflow end, with the restriction in the width occurring at about 2.54 cm from the ends. The steel tip is attached to the glass funnel by means of a Teflon tube. The funnel is calibrated so as to allow 100 ml of water to go through in 6 seconds using the above procedure.

Ordinarily the enzyme conversion will be carried out for periods ranging from half an hour to 24 hours or more depending on the temperature, the type and concentration of enzyme, starch concentration, and viscosity. The enzyme reaction is terminated by raising the temperature to about 85° C. and maintaining at that temperature for about 10 minutes to fully deactivate the enzyme. Acid deactivation, as known in the art, can also be employed to deactivate the enzyme.

While it is preferred that the starch be steam cooked and subsequently acid hydrolyzed, it is also possible to obtain enzyme hydrolyzed starch for use herein by treating the granular starch with the amylase and then stream cooking.

The resultant product is characterized by a dextrose equivalent (DE) of 2 to 40. Dextrose equivalent is defined as the reducing power of the hydrolyzate. Each starch molecule has one reducing end, therefore DE is inversely related to molecular weight. The DE of anhydrous D-glucose is defined as 100 and the DE of unhydrolyzed starch is virtually zero.

If waxy starch is employed as the base material, the final product can be used directly in liquid form wherein it will remain stable if stored under sterilized conditions. Alternatively, and in the case of non-waxy starches, it can be recovered in powder form by conventional spray drying or drum drying techniques. It is characterized by its low viscosity, high degree of tackiness when wet so it can hold seasonings or particulates to the food during the drying process. It is also quick drying, providing a strong adhesive bond when dried thus ensuring that the seasonings or particulates will not fall off during later processing, packaging, transportation and storage.

In order to use the resulting starch as a food binder, according to this invention, it is ordinarily dissolved in water or hot water; the solution is prepared so that the solution concentration of the binder is 5 to 50%, preferably above 20%, most preferably above about 30%. The binder solution is then applied to the surfaces of foodstuffs such as cereal pieces, cookies, biscuits, etc., and seasonings, flavorants and colorants such as spices, fruit pieces, powdered cheese, granulated sugar, coconut, seeds, peanut grits, coloring agents, etc., are adhered to them using conventional processes such as the spray method, sponge roller method, brush application method, or immersion method.

EXAMPLE 1

Using the following procedure a beta-amylase treated starch was prepared. The resultant starch was then formulated into various food products as described in the Examples which follow.

Slurry 25 kg (anhydrous weight) of Amioca in 100 L of water. Adjust pH to 5.3 to 5.7 with 10% hydrochloric acid. Steam cook the slurry to produce a starch dispersion of 20 to 24% solid with about 80 to 150 seconds of funnel viscosity measured at 10% solid (100 ml) and 22° C. with a standardized funnel. Cool down the starch to 50° C. in a reaction tank. Add 50 g of beta-amylase solution (1600 U/g) to starch amylolytic digestion. Once the desired viscosity specification (16 to 60 seconds as measured at 19% solids and room temperature with 100 ml using a standard funnel) is reached, stop the reaction by rapidly heating the dispersion to 85° C. and hold for about 10 minutes. Spray-dry the dispersion to obtain a powdered product.

EXAMPLE 2

The resultant food starch was then used to make a corn flake/apple bits cereal, using the following composition and procedure:

| Ingredient | Quantity (9/batch) |
| --- | --- |
| Corn flakes | 250.0 |
| Sugar | 14.8, in 7.0 g of water. |
| Molasses | 1.1 |
| Apple granules | 25.0 |
| Starch of Ex. 1 | 5.6, dispersed in 13.1 g of water. |

1) Make the sugar solution, add molasses, mix and heat to 120° F.
2) Pour corn flakes and apple granules into bench-top panning reel, tumble for 30 seconds.
3) Spray the dispersed material, tumble for another 60 seconds.
4) Spread sugar/molasses syrup onto flakes and tumble for 60 seconds.
5) Spread the coated product to a tray.
6) Dry in a convention oven for 15 minutes at 250° F.
7) Cool and break apart.

EXAMPLE 3

The tackiness and adhesive strength or the starch of Example 1 was compared with other commercial products and tested using the following procedures:
A. Adhesion Test:
1. Weight crackers (saltines)—weigh
2. Brush "glaze" solutions at 30% solids onto one surface—weigh
3. Drop apple bits onto the wet glaze, shake off excess and weigh
4. Dry in oven
5. When cool, gently brush off any loose apple bits and weigh bits
6. Calculate:
   weight of glaze pick-up
   weight of apple bit pick-up
   weight of apple bit loss (brushed off in step 5)
   % of apple bits It is important to have sufficient pick-up of the glaze without having it soak into the cracker; sufficient pick-up of apple bits and minimal loss after drying.
B. Tackiness:

Subjective test done by placing a drop of the solution between the fingers and observing the stickiness. The formation of thin strands of material between the fingers as it dries is considered an advantage.

| Sample | Tackiness | Adhesion |
| --- | --- | --- |
| Starch of Example 1 | Excellent | Very Good |
| Acid converted amioca (Tapon 85) | Good | Very Good |
| Tapioca pyrodextrin | None | Good |
| 10 DE Maltodextrin | None | Fair |
| 24 DE Corn Syrup | None | Fair |
| 42 DE Corn Syrup | None | Fair |
| Gum (Kelco EX7421) | None | Fair |

The tackiness was measured by finger tests of the liquid samples. The tackiness reflects the ability of the samples to adhere the apple granules to the cracker during the drying process. The adhesion strength is measured by the percentage amount of apple granules finally adhered to the crackers at the end of the process. It reflects the adhesion effectiveness the samples in the tests.

Similar results were achieved coating flavorants onto tortilla chips using the following ingredients and procedures:

| Ingredients | Grams | Percentage |
| --- | --- | --- |
| Tortilla Chips | 150 | |
| Flavor Powder | 9–30 | 6%–20% |
| 30% Starch Solution | 75–15 | 5%–10% |

Preparation
1. Pour tortilla chips and flavor powder into benchtop pan coater.
2. Spray the starch solution onto the chips.
3. Tumble for 60 seconds after spraying.
4. Spread coated chips onto tray and dry for 5 minutes at 250° F. in Despatch oven.
5. Cool and break apart.

EXAMPLE 4

In the following example waxy maize starch was enzyme converted as described in Example 1 but using alpha-amylase as the enzyme. The conversion was carried out to achieve three different viscosity levels, 60, 45 and 13 seconds.

The testing procedure described in Examples 2 and 3 was repeated using the liquid samples without subsequent drying. The results are shown in the Table below. In the table, the test results are presented in quantitative form indicating the percentage of apple granules retained on the final product.

| Initial Viscosity | % Retention |
| --- | --- |
| 60 seconds | 84% |
| 45 seconds | 88% |
| 13 seconds | 82% |

EXAMPLE 5

Tapioca was also enzyme converted and used in accordance with the present invention. Since tapioca is not a waxy starch, it is necessary to spray dry the enzyme treated starch prior to redispersion and application.

Two samples of tapioca were acid converted as described in Example 1. One sample was treated with alpha-amylase, the second with beta-amylase. Both samples, when tested as food binders, provided very good adhesion and tackiness.

We claim:

1. A method for adhering seasoning to a food product comprising the steps of:
   a) coating the food product with a solution containing from 5 to 50% by weight of an amylase treated starch;
   b) adhering thereon at least one seasoning, flavorant, or colorant; and
   c) drying the resultant food product;
   the amylase treated starch having been prepared by steam cooking starch, and enzymatically hydrolyzing said cooked starch with a single amylase in an amount and for a sufficient time to achieve a funnel viscosity, measured at 19% solids using a standard funnel, of 7 to 80 seconds, and a dextrose equivalent (DE) of 2 to 40.

2. The method of claim 1 wherein the starch is a waxy starch.

3. The method of claim 1 wherein the amylase used to hydrolyze the starch is beta-amylase.

4. The method of claim 1 wherein the amylase used to hydrolyze the starch is alpha-amylase.

5. The method of claim 1 wherein the starch is hydrolyzed to a viscosity of 16 to 60 seconds.

6. The method of claim 3 wherein the starch is hydrolyzed to a viscosity of 16 to 60 seconds.

7. The method of claim 1 wherein the steam cooking is carried out in a slurry at a solids level of 10 to 40%, a temperature of from about 120° C. to about 170° C., and a pH of 4 to 7 with a pressure greater than 60 psi.

8. The method of claim 7 wherein the steam cooking is carried out in a slurry at a solids level of 20 to 25%, and a pH of 4.5 to 5.5.

9. The method of claim 1 wherein the concentration of the starch in the solution is greater than 30% by weight.

* * * * *